July 12, 1966  F. J. GLEVE  3,260,346
METHOD OF AND APPARATUS FOR HANDLING WORKPIECES
Filed Dec. 28, 1962  6 Sheets-Sheet 3

INVENTOR.
BY FRANK J. GLEVE
HIS ATTORNEY

July 12, 1966  F. J. GLEVE  3,260,346
METHOD OF AND APPARATUS FOR HANDLING WORKPIECES
Filed Dec. 28, 1962  6 Sheets-Sheet 4
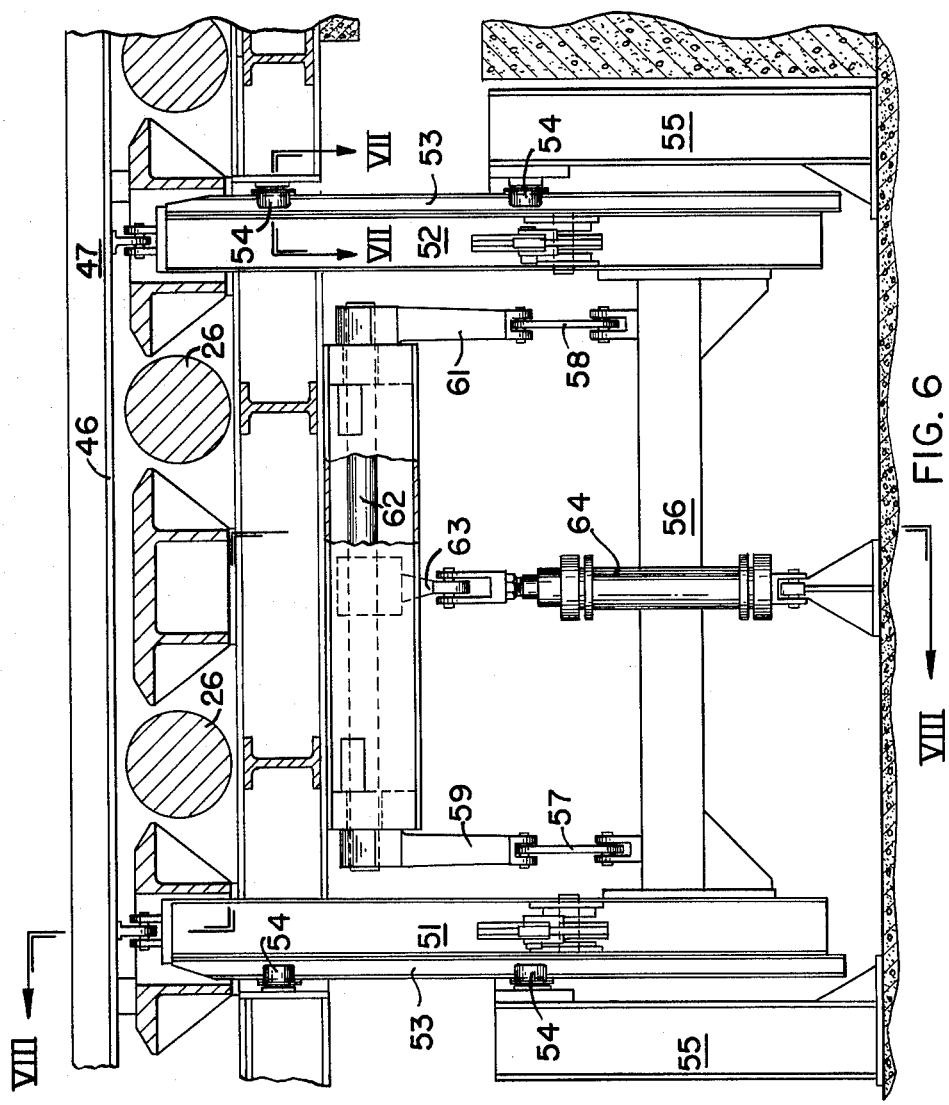
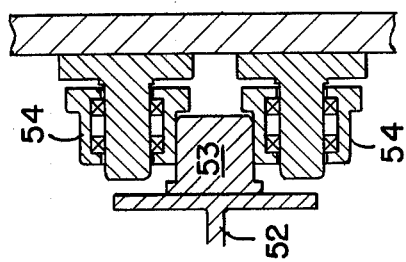
INVENTOR.
BY FRANK J. GLEVE
HIS ATTORNEY

INVENTOR.
BY FRANK J. GLEVE
HIS ATTORNEY

July 12, 1966 F. J. GLEVE 3,260,346
METHOD OF AND APPARATUS FOR HANDLING WORKPIECES
Filed Dec. 28, 1962 6 Sheets-Sheet 6

INVENTOR.
BY FRANK J. GLEVE
HIS ATTORNEY

United States Patent Office 3,260,346
Patented July 12, 1966

3,260,346
METHOD OF AND APPARATUS FOR HANDLING WORKPIECES
Frank J. Gleve, Pittsburgh, Pa., assignor to United Engineering and Foundry Company, Pittsburgh, Pa., a corporation of Pennsylvania
Filed Dec. 28, 1962, Ser. No. 247,907
3 Claims. (Cl. 198—31)

This invention relates to a method of and apparatus for handling elongated metallic workpieces and in one aspect, to a method of and apparatus for separating workpieces from each other, and in another aspect, to a method and apparatus for accumulating workpieces as the workpieces issue from a processing unit, such as a rolling mill.

In the operation of certain types of rolling mills, such as, for example, a continuous billet mill, a flying shear is customarily employed at the delivery end of the mill to remove the terminal scrap end portions from the workpieces and to divide the workpieces into a number of billets of shorter predetermined lengths. While the length of these scrap "ends" may vary, they generally never exceed the predetermined regular length of the billets.

In some such mills all of the sheared lengths, whether they were scrap billets or not, except for the very short scrap lengths which were allowed to fall down between the shear and the adjacent shear delivery table upon being sheared, were conveyed to the runout table, allowed to cool, after which they were gathered into large bundles. Since these bundles contained both scrap and acceptable billets, it was necessary to separate the scrap billets from the acceptable ones before the latter could be sold or sent through the next rolling operation.

In other mills the scrap billets were separated from the acceptable billets while the billets were passing over a cooling table. This separation was accomplished by an overhead crane in conjunction with a special gripping device which clamped onto the scrap billets individually permitting them to be raised from off the cooling table.

It has also been found advantageous to separate various billets for each other for other reasons. In the process of the solidification of the ingots from which the workpieces are rolled, there are portions thereof that possess a very high degree of chemical uniformity as compared with other portions. Since the billets that are eventually formed from the more uniform metal can be sold at a premium price, some producers are interested in separating these billets from the others. A very convenient time to perform this separation is immediately after the shearing operation, since the billets possessing the uniform characteristics will always be found in approximately the same portion of the workpieces, depending upon which end of the ingot is fed first into the mill, so that after shearing these billets can be noted and separated.

In still another procedure of operation of the mills under discussion, it is desirable to be able to cut out a "test" billet or portion of a billet from the workpiece and separate the test billet from the others formed from the workpiece.

It was apparent to the designers of modern billet mills and the like that if the optimum production was to be realized the present procedure of removing the scrap billets would have to be abandoned. Moreover, the desire to separate also the billets having a high degree of chemical uniformity and test billets made it imperative that a new process and apparatus be developed. This new process and apparatus would have to possess the virtues of being substantially automatic, requiring the minimum of manual assistance, efficiently and economically separating closely, rapidly traveling billets, bars, rods, etc. and disposing the separated billets, etc. without any delay or interruption in the operation of the shear or mill.

It is an object of the present invention to provide a method and apparatus that will accomplish each and every one of the aforesaid objectives.

More specifically, it is an object of the present invention to provide a method and apparatus for automatically separating certain billets or bars, etc. from other billets or bars, etc. in a manner that will assure uninterrupted operation of the processing equipment and without requiring the services of a crane or additional workmen.

A further object of the present invention is to provide a method and apparatus for accumulating and storing separated billets or bars, etc. in a manner to assure uninterrupted operation of the processing equipment and where the services of a crane are only needed to remove a bundle of the billets or bars, etc. after they have been accumulated.

According to one form of the method and apparatus of the present invention there is provided, in conjunction with a shear, a delivery table having its rollers so arranged and constructed that the sheared billets, etc. are caused to travel in a predetermined path. At the delivery side of the table a billet separator consisting of a retractable billet deflecting device is arranged having a portion thereof normally projecting into the path of travel of the billets, etc. Under normal conditions the front ends of the billets contact the deflecting device and are deflected into a second path of travel which is oblique relative to the first. When, however, the oncoming billet, etc. is, for example, a scrap billet then in that event the deflecting device will be automatically moved as initiated by a remote signal to thus allow the billet, etc. to continue on its normal path of travel from where it will pass on to a storage area. Immediately after the billet, etc. passes under the deflecting device, the device will be repositioned in readiness to receive and deflect the next oncoming billet.

These features and advantages, as well as others, will become more apparent from the following description when read in the light of the accompanying drawings of which:

FIGURES 1a and 1b constitute a broken plan view of the delivery equipment of a billet mill arrangement, including a shear delivery and skew table, the skew tables being designed to incorporate in part the features of the present invention;

FIGURE 6 is an elevational view of the billet accumulating device shown partially at the left of FIGURES 1b and 2;

FIGURE 7 is a sectional view taken on lines VII—VII of FIGURE 6;

Figure 1:
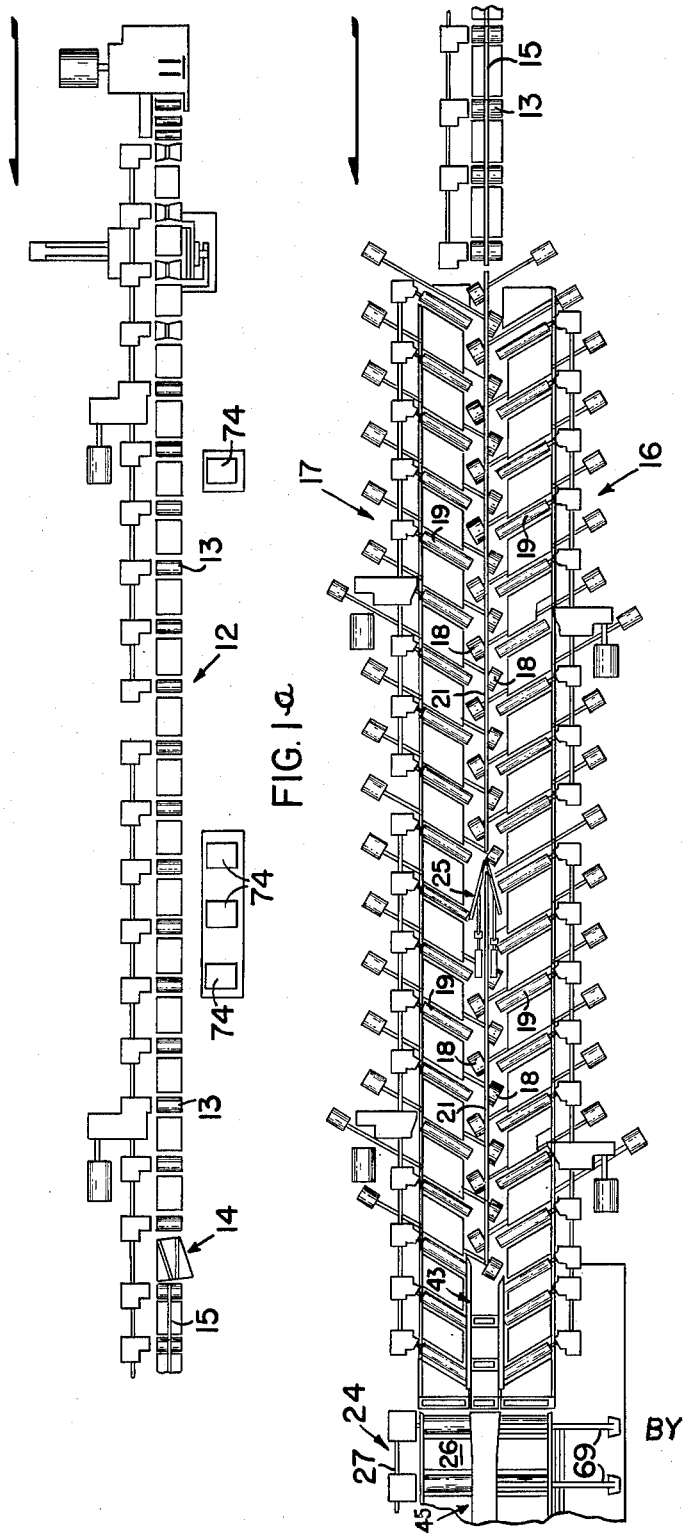

With reference to FIGURES 1a and 1b there is illustrated diagrammatically the billet processing and transferring equipment of the delivery end of a billet mill, not shown. As shown by the arrows in these figures, the workpiece issues from the billet mill in a direction from right to left as one views the figures. The delivery end equipment of the mill essentially includes a flying shear 11, a shear runout table 12 having a number of driven rollers 13, an automatically controlled billet-switching device 14 of a type well known in the art arranged a short distance from the delivery end of the runout table 12 and between two of the rollers 13. The switching device 14 selectively directs oncoming billets to either side of a center dividing guard 15 which extends from the end of the table 12 to the switching device.

As illustrated in FIGURE 1b, the delivery end equipment also consists of two identically constructed skew tables 16 and 17 arranged in a side-by-side fashion at the delivery end of the table 12. Reference will be made to only the essential components of the skew tables 16 and 17 which can be best seen in FIGURE 2, since this is all that is deemed necessary for an understanding of the present invention. Each skew table includes a plurality of relatively large diameter, short-faced "bullet" shaped rollers 18 which are individually driven by separate motors located at the far side of the opposite table. The skew tables also include a plurality of billet gathering rollers 19 having relatively small diameter. The rollers 19 of each table are driven by separate line shaft drives located at the far side of each table. It will be noted in FIGURE 4 that the bullet rollers 18 and the ganging rollers 19 are located with their axes of rotation lying in a common horizontal plane so that the billet supporting surfaces of the rollers lie in different elevations. The axes of the rollers 19 of the table 16 form acute angles measured in a counter-clockwise direction from the center line formed by the two tables, while the axes of the rollers 18 thereof form obtuse angles measured in a counter-clockwise direction from the center line formed by the two tables. The axes of the rollers 18 and 19 of the table 17 are similarly arranged with their angles measured in a clockwise direction.

Figure 2:
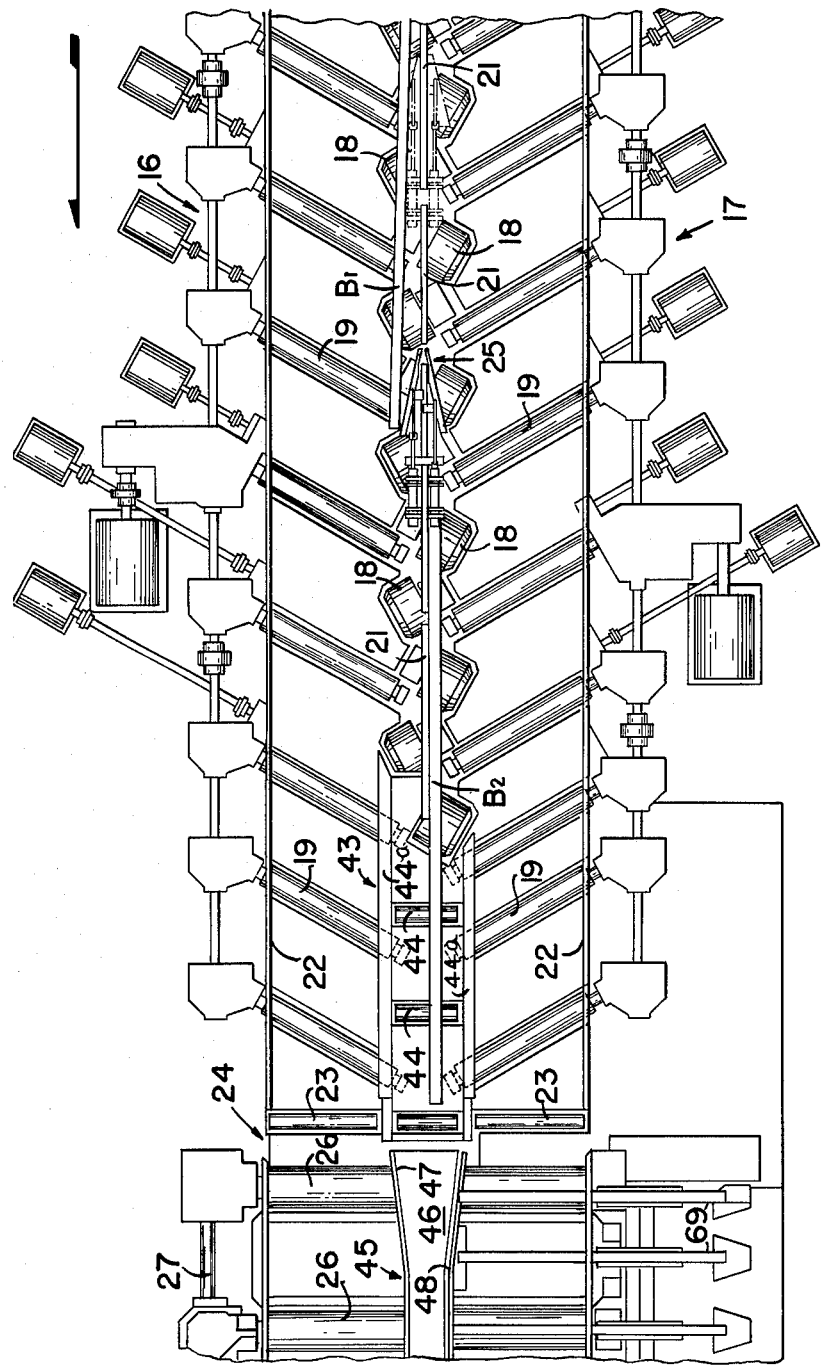
FIGURE 2 is an enlarged plan view of the skew tables shown in FIGURE 1b illustrating more in detail the billet separator and accumulating device of the present invention.

As best shown in FIGURE 2 a longitudinally extending guard 21 separates the tables 16 and 17, being arranged above the bullet rollers 18 and serving as a common guard for both tables. The bullet rollers 18 of each table being obliquely arranged will urge the billets toward the guard 21. In addition to the guard 21, at the drive sides of the table extending parallel to the gurad 21, each table is provided with guards 22 which are secured to the tables. These guards extend above the rollers 19.

At the delivery end of the skew tables 16 and 17 there is provided retractable end stops 23 of a type well known in the art. When in the billet stopping position, the stops interrupt the path of travel of the billets whereby the final deceleration of the billets is accomplished. It will be appreciated that as each successive billet is discharged onto either of the tables 16 and 17, the rollers 19 will decelerate them, but at the same time the billets will be conveyed in a transversal and longitudinal direction. As a result, when the billets come to rest a "pack" will be formed. Once a pack is formed, it will be conveyed onto a runout table 24 which services both of the tables 16 and 17, this table having rollers 26 that approximately equal the combined widths of the tables 16 and 17. FIGURE 2 best illustrates the relationship of these tables in which it will be further noted that the rollers 26 of the table 24 are driven by a line shaft 27.

Figure 3:
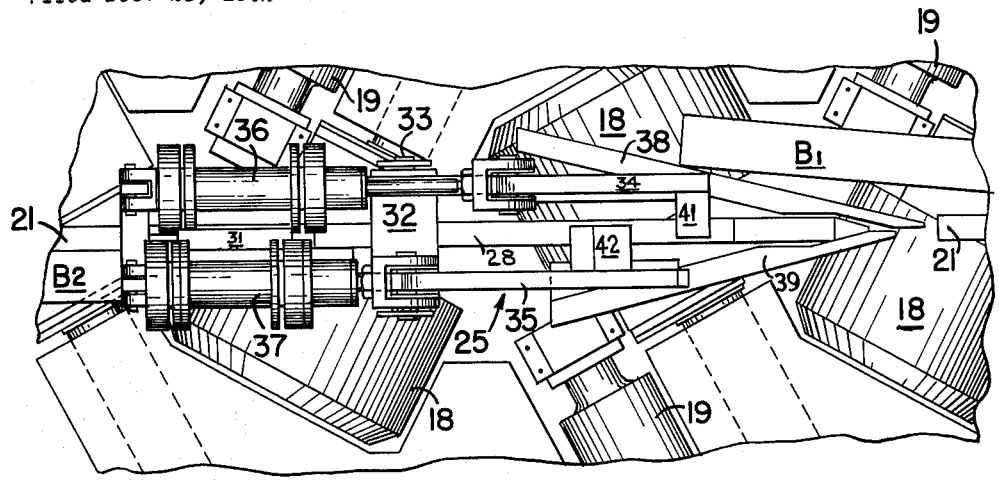
FIGURE 3 is an enlarged partial plan view of the billet separator shown in FIGURE 2.
Figure 4:
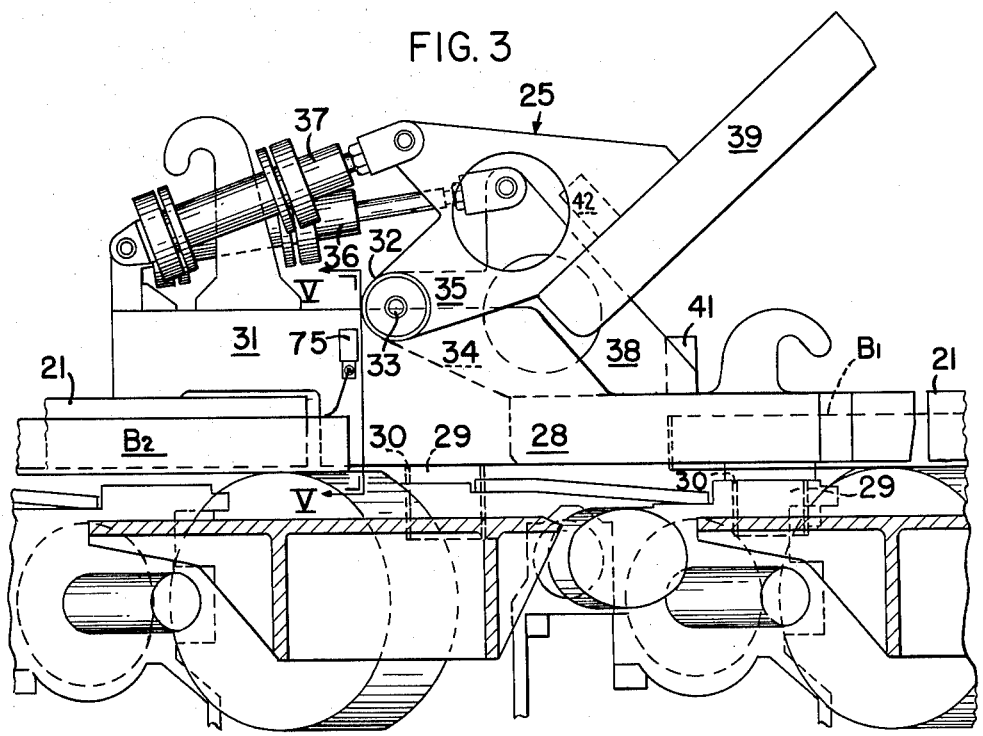
FIGURE 4 is an elevatinal view of FIGURE 3.
Figure 5:
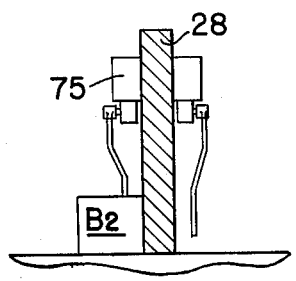
FIGURE 5 is a sectional view taken on lines V—V of FIGURE 4.

With reference now to that aspect of the present invention that relates to a method of and apparatus for automatically separating different types of billets from each other, say for example, scrap or test billets from acceptable ones, attention is drawn to FIGURES 3, 4 and 5. Before referring to these figures, however, it is important to note first, as illustrated in FIGURE 1b, that toward the delivery end of the skew tables a section of the guard 21 has been removed and in its place a billet separator 25 constructed in accordance with the present invention has been inserted.

As shown in FIGURES 3 and 4, the billet separator includes a base member 28 of which the lower portion is constructed as a continuation of the guard 21, which portion, as will be more fully appreciated hereinafter, serves in certain instances the purposes of a guard. The base member 28 also has two spaced-apart lugs 29 extending downwardly from its bottom surface, these lugs being received in suitable recesses 30 provided in the skew tables 16 and 17 to which the lugs are secured. It will be appreciated that by providing similar recesses along the longitudinal axes of the combined tables 16 and 17 and by replacing a section of the guard 21, the billet separator 25 can be positioned at any desired location along the skew tables.

The upper portion of the base member 28 is constructed with a rearwardly extending arm 31 which overhangs the adjacent guard 21. To the front end of the arm 31 a tubular separator 32 is secured, the separator receiving a shaft 33 which projects from its opposite ends and to which end rotatable bell crank levers 34 and 35 are secured. The levers 34 and 35 have upwardly extending arms to which is connected the rods of individual piston cylinder assemblies 36 and 37. The piston cylinder assemblies are, in turn, clevis mounted to the far end and at the top surface of the overhanging arm 31.

Diverging billet deflector members 38 and 39 are attached to the lower portions of the bell crank levers 34 and 35, respectively. As best shown in FIGURE 3 the deflector members diverge in a direction toward the entry side of the skew tables, their front adjacent ends meeting on the longitudinal axes of the combined tables 16 and 17. As the position of the deflector member 38 and the billet $B_1$ aptly illustrates in FIGURE 3, when the members 38 and 39 are in their lower positions (billet deflecting positions), their front ends fall behind the vertical sides of the guard 21 so that there is no occasion for the billets to snag or to be caught by the front ends of the members. Stops 41 and 42 are attached to the inner vertical surfaces of the bell crank levers 34 and 35 which contact the top surfaces of the base member 28 thereby to establish the billet deflecting positions of the deflector members.

As exemplified in FIGURE 4 with respect to the deflector member 39 on the operation of the piston cylinder assembly 37, the lever 35 rotates about the tubular member 32 allowing the deflector member 39 to be displaced away from the top surface of the bullet rollers 18 an amount sufficient to permit an oncoming billet to pass freely under the raised deflector member. Billet $B_2$ shown on FIGURE 4 serves to illustrate this. In this instance the base 28 serves as a guard and under the influence of the rollers 18 the billets will be urged against the guard while they continue on their undeflected path of travel.

With reference to FIGURES 1b and 2 it will be noted that at the delivery ends of the tables 16 and 17 the bullet rollers 18 and the guard 21 have been replaced by a relatively centrally arranged short length table 43. This table is arranged above and in a non-obstructing relationship to the ganging rollers 19 and comprises a plurality of non-driven short length rollers 44. As in the case of the tables 16 and 17, end guards 44a are provided at the opposite side of the rollers.

In now coming to the second aspect of the present invention and in referring to FIGURES 1b, 2, 6, 7, 8 and 9, there is provided an apparatus for discharging the billets that pass over the table 43 to a storage station. As shown in FIGURE 1b, the billets that are allowed to pass on to the table 43 are transferred from this table to a billet discharge device 45 from where they are deposited into a storage station. In first referring to the discharge device and in referring to FIGURE 8, this device takes the form of an elongated channel which is made up of a bottom skid plate 46 and two perpendicularly arranged plates 47 and 48. The plates 47 being secured to the runout table 24 serve as a side guard at one side of the skid plate 46. The plate 47 forms a guard on the other side of the skid plate to which it is secured. To facilitate easy entrance of the billets into the discharge device, the front end of the channel is bell shaped as can be seen in referring to FIGURE 2.

Figures 8, 9:
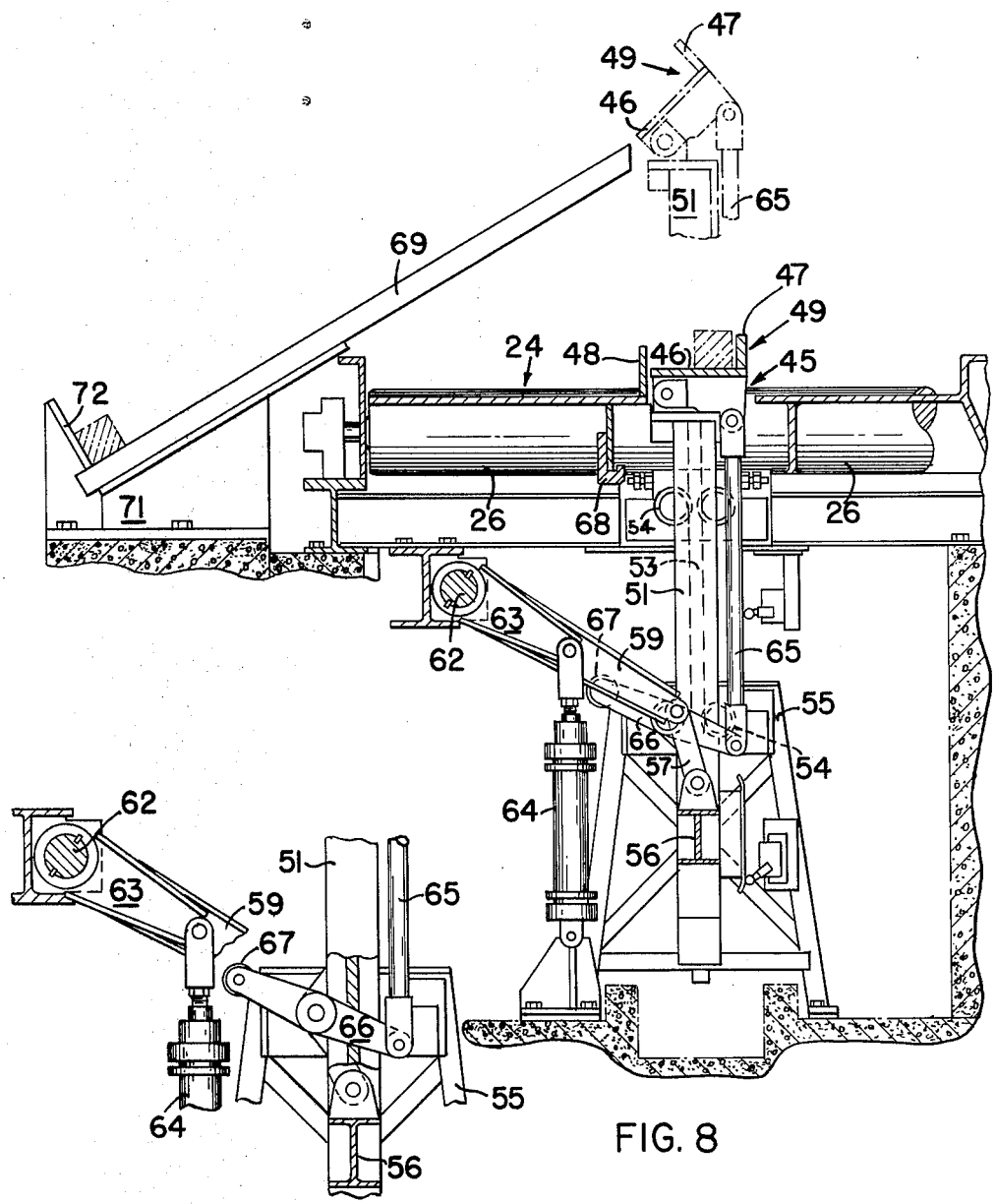
FIGURE 8 is a sectional view taken on lines VIII—VIII of FIGURE 6.
FIGURE 9 is an enlarged partial view of the lever arrangement shown in FIGURES 6 and 8, certain elements being broken and others shown in section for clarity.

It will be noted that the skid plate 46 and side plate 47 form an L-shaped member 49 which, as indicated by the outline portion thereof in FIGURE 8, is adapted to be raised and tilted to effect a discharging of the billet therefrom. The mechanism for raising and lowering the member 49 is best shown in FIGURES 6, 7 and 8. This mechanism includes two spaced apart rams 51 and 52 pivotally secured to the underside of the skid plate 46 at the end adjacent the side guard plate 48. To the outer faces of the rams, as best shown in FIGURE 6, elongated guide bars 53 are secured. The guide bars 53 are received between four pairs of rollers 54 which are rotatably attached, in the case of the two upper pairs to the runout table supporting structure and in the case of the two lower pairs to suitable supports 55. A tie bar 56 rigidly interconnects the lower ends of the rams 51 and 52. As shown in FIGURE 6, pivotally attached to the tie bar 56 are two links 57 and 58 which, in turn, are connected to lifting arms 59 and 61 respectively. The lifting arms 59 and 61 are each keyed to the opposite ends of a torque shaft 62 which is rotatably carried by the supporting structure of the runout table 24 as can be seen in FIGURE 8. A torque arm 63 is provided having one end keyed to the central portion of the torque shaft 62 and the other end connected to the rod of a vertically arranged piston cylinder assembly 64 which is pivotally connected to a bracket which, in turn, is bolted to the foundation.

The present invention also provides means for automatically tilting the L-shaped member 49 at the predetermined elevation illustrated in the outline form of the member shown in FIGURE 8. The mechanism for accomplishing this purpose includes two push rods 65, one of which is only shown, arranged parallel to the rams 51 and 52 having their upper ends attached to the bottom and at one side of the skid plate 46. The arrangement of the lower ends of the push rods 65 is better illustrated in FIGURE 9 where the rods are shown connected to one of the ends of two centrally mounted levers 66, only one of the levers being shown. Attached to the other ends of the levers 66 are rollers 67 of which only one is shown. As will be more fully appreciated hereinafter and as best shown in FIGURE 8, each roller 67 engages plates 68 located at one side of the center of the tables 4, only one of the plates 68 being shown on the drawings.

As best shown in FIGURE 8, cooperating with the billet discharge device 45 is a billet collecting station which receives the billets discharged from the device. This station is made up of a series of angularly disposed parallely arranged rails 69, having a portion of their length extending over the runout table 24. The lower ends of the rails 69 terminate in a frame 71 to which also is secured a bumper plate 72 arranged at right angles to the rails 69 which serves as an abutment for the billets sliding down the rails.

Figure 10:
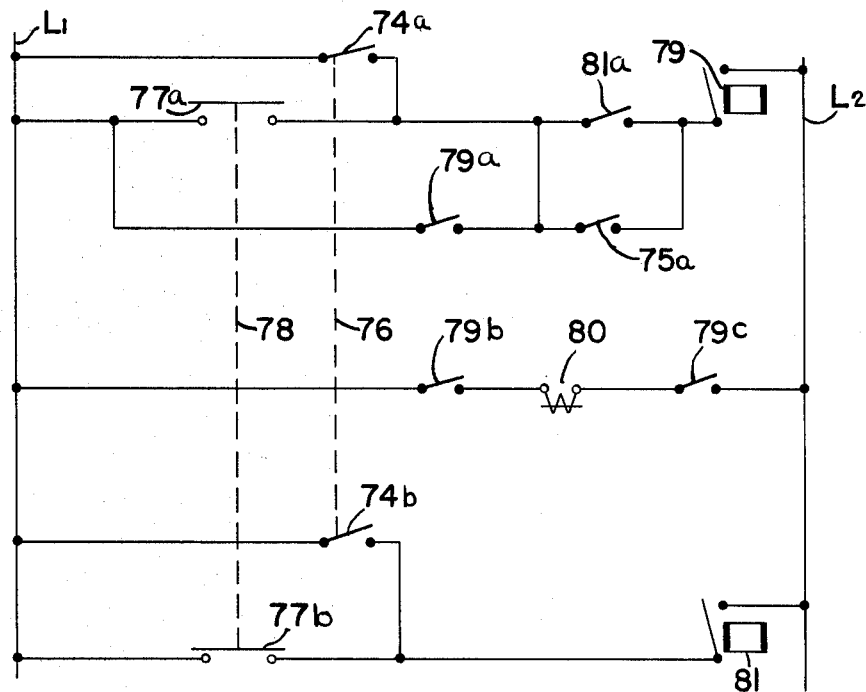
FIGURE 10 is an electrical circuit diagram employed in conjunction with the billet separator shown in FIGURES 2, 3 and 4.

As heretofore indicated in certain types of mill operations, it is highly desirable to automate the billet deflecting apparatus 25. For this purpose an electrical control system is provided, a circuit for which is shown in FIGURE 10. For explanatory purposes it is deemed only necessary to describe the electrical circuit for one of the skew tables and billet deflecting member and for this purpose the skew table 17 and deflecting member 39 have been selected. It will be appreciated, however, that a similar circuit would be provided for the table 16 and deflecting member 38 or the two circuits combined as convenience may dictate. Before referring to the electrical circuit shown in FIGURE 10, it will be noted that in FIGURE 1a four photo-electric cells are arranged along the shear runout table 12 which are used to measure the lengths of the billets in a well-known manner. Also that in connection with the deflector apparatus 25 limit switches are provided to detect the presence of billets passing under the deflectors 38 and 39. Only one of these limit switches 75 is identified in the drawings, that being in FIGURES 4 and 5.

And now referring to the circuit, two primary power lines $L_1$ and $L_2$ are provided. To the line $L_1$ there is connected a subcircuit consisting of two spaced-apart relay contacts 74a and 74b of the photo-electric cells 74, the relay not being shown. These contacts 74a and 74b are mechanically tied together as represented by a dash line 76. Also connected to the line $L_1$ is a second subcircuit consisting of two spaced-apart relay contacts 77a and 77b of an electrical push button system, the push button and its relay not being shown. These two contacts are also mechanically tied together as represented by the dash line 78.

Electrically connected to the subcircuit containing the relay contacts 74a and 77a is a relay 79 which is connected to the line $L_2$. The relay 79 has contacts 79a, 79b, and 79c. The relay contacts 79b and 79c form part of a subcircuit extending between the power lines $L_1$ and $L_2$ and are separated by a solenoid valve 80. The relay contact 79a of the relay 79 constitutes part of a subcircuit which includes a contact 75a of the limit switch 75. This subcircuit, as shown on FIGURE 10, is connected at three points to the circuit containing the contact 77a and the relay 79. The circuit also includes a timing relay 81 which is contained in the subcircuit that includes the contacts 74b and 77b of the photo-electric cell and push button system, respectively. The timing relay has a contact 81a which forms a part of the subcircuit containing the relay 79. The contact 81, as shown in FIGURE 10, is normally closed.

The following comprises a brief description of the operation of the electrical circuit:

The circuit will remain inactive unless activated by the closing of the contact 74a–74b or 77a–77b, depending upon whether or not the photo-electric or the push button system is being employed. Assuming that the photo-electric system is being employed and has given a signal, this will close the contacts 74a and 74b, accordingly, energizes the relay 79 since, as mentioned previously, the contact 81 of the timing relay 81 is normally closed. The energizing of the relay 79 will effect a closing of its contacts 79a, 79b and 79c, the latter two causing the solenoid 80 to be activated which will effect an operation of the piston cylinder assembly 37. At the same time that the relay 79 is energized, the timing relay 81 will be energized. The energization of the relay 81, however, will not open its contact 81a until a time has lapsed sufficient to allow the billet to pass under the deflector member 39 which will trip the limit switch 75, whereupon the contact 75a will be closed. Consequently, when the timing relay 81 has run its course, its contact 81a will open; thus, breaking the subcircuit of which it forms a part. However, in view of the fact that the relay contacts 75a and 79a remain closed until the billet passes under the limit switch 75, the relay 79 remains energized. Once the billet has passed out from under the limit switch 75, the limit switch contact 75a will open breaking the circuit, thus operating the cylinder 37 to lower the billet deflecting member 39.

With the foregoing description in mind a brief summary of the operation of the disclosed method and apparatus will now be given. With reference first to the handling of a scrap or test portion of a billet, as previously mentioned, these portions will have a length longer than the length that will fall into the scrap disposal equipment of the shear 11 but shorter than the regular length billets. As the billets are delivered from the shear 11, they pass over the shear runout table 12 where the photo-electric cells 74 will measure their lengths. Should the length of the billets be of the regular length, the electrical circuit provided for the deflector apparatus 25 will remain inactive.

The shear runout table 12 will be operated at a speed sufficiently greater than the operating speed of the shear thereby causing a separation of the billets. From the shear runout table the billets cut from one workpiece will be directed by the switching device 14 to one or the other of the two skew tables 16 and 17. Let it be assumed that the switching device 14 is positioned to direct the billets onto the table 16. As the billets are discharged from the shear runout table 12 onto the bullet rollers 18, as previously explained, they will be urged in a direction toward the center guard 21. Since the electrical circuit is inactive, the deflector member 38 of the deflector apparatus 25 will be located in its billet deflecting position, as shown in FIGURE 3, whereby the front end of the billet $B_1$ will engage the deflecting member and be diverted away from the center guard 21 on to the ganging rollers 19. A complete transfer of the billets from the rollers 18 to the rollers 19 will be quite rapid in view of the elevational difference between the supporting surfaces of these rollers.

Should one of the billets issuing on to the rollers 18 be a scrap or test billet, the photo-electric arrangement will initiate operation of the piston cylinder assembly 36 to cause the deflector member 38 to be raised in a predetermined time sequence with respect to the time it takes the billet to approach the deflecting member. In the raised position, the deflector member 38 will assume a position illustrated by the deflector member 39 in FIGURES 3 and 4. Consequently, instead of the scrap billet being deflected on to the rollers 19, it is allowed to pass on to the table 43 and eventually on to the channel member of the discharge apparatus 45. In this connection the member 38 will assume the same relationship with the member 39 has to the billet $B_2$ in FIGURES 3 and 4. The friction between the billet and the skid plate 46 of the channel member will serve to decelerate the billet and the billet will be brought to a stop.

After this the piston cylinder assembly 64 of the discharge apparatus 45 will be actuated to move the rams 51 and 52 vertically which will move the L-shaped member 49, whereby the rollers 67 will engage the striker plates 68 causing a tilting of the L-shaped member 49 which will cause the billet to fall on to the rails 69 of the billet storage station. After a number of billets have been collected in the storage station, they will be removed by a crane.

As previously mentioned, should it be desired to separate billets possessing the high degree of uniformity of chemical or metallurgical characteristics, then, in that event, the operator can initiate the operation of the particular deflector members 38 or 39 by the push button system.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In an apparatus for handling and gathering articles including:
  a guide engageable by the articles,
  a first group of horizontally spaced rotatable rolls over which articles are conveyed, the axis of rotation of each of which is disposed at an angle such that articles passing thereover are urged away from said guide,
  a second group of longitudinally spaced rotatable rolls having at least a portion thereof of greater diameter than and interspersed between the rolls of said first group, the axis of rotation of each of said rolls of said second group being disposed at an angle such that articles passing thereover are urged towards said guide,
  a third group of horizontally spaced rotatable rolls over which articles are conveyed, the axis of rotation of each of which is disposed at an angle such that articles passing thereover are urged away from said guide,
  a fourth group of longitudinally spaced rotatable rolls having at least a portion thereof of greater diameter than and interspersed between the rolls of said third group, the axis of rotation of each of the rolls of said fourth group being disposed at an angle such that articles passing thereover are urged towards said guide,
  said guide longitudinally serving to divide the first and second groups of the rolls from the third and fourth groups of rolls, a portion of said guide constituting a deflector for urging articles conveyed in a first direction of travel by said second and fourth groups of rolls onto the first and third groups of rolls at which time the articles assume a second direction of travel, the improvement comprising:
  said deflector comprising two distinct article-deflecting members,
  one of said members having a portion that projects into the conveying path of said second group of rolls and the other member of said deflector having a portion that projects into the conveying path of said fourth group of rolls,
  said portions of said members being engageable by the leading ends of the articles, and
  means for moving said deflecting members to a nondeflecting position so as to permit articles transferred over said second and fourth groups of rolls to continue along in said first direction of travel.

2. An apparatus, according to claim 1, including:
  article discharge means arranged at one end of the apparatus for receiving undeflected articles issuing over said second and fourth groups of rolls,
  said discharge means having an article receiving position and an article discharging position,
  means for moving said discharge means to one of the other of said positions, and
  a means for receiving the discharged article.

3. In an apparatus for handling and gathering articles, including:
  a guide engageable by the articles,
  a plurality of horizontally spaced rotatable rolls over which workpieces are conveyed, the axis of rotation of each of which is disposed at an angle such that articles passing thereover are urged away from said guide,
  a plurality of longitudinally spaced rotatable rolls having at least a portion thereof of greater diameter than and interspersed between said first-mentioned rolls,
  the axis of rotation of each of said rolls being disposed at angles such that articles passing thereover are urged towards said guide,
  a workpiece deflecting means arranged as a continuation of said guide, the improvement comprising:
  said deflecting means comprising a workpiece deflecting member having a portion projecting into the conveying plane of said second-mentioned rolls, said portion arranged so as to be engageable by the leading end of articles to deflect articles being carried in a first direction of travel over said second-mentioned rolls onto said first-mentioned rolls at which time the articles assume a second direction of travel, and
  means for moving said deflecting member to a nondeflecting position so as to permit an article transferred over said second-mentioned rolls to continue to pass in the first direction of travel.

References Cited by the Examiner
UNITED STATES PATENTS

| | | | |
|---|---|---|---|
| 943,799 | 12/1909 | Stebler | 209—73 |
| 1,843,852 | 2/1932 | Troy | 214—710 |
| 2,602,537 | 7/1952 | Talbot | 198—127 |
| 2,821,302 | 1/1958 | Fowler | 209—111.5 |
| 2,933,185 | 4/1960 | Coleman | 209—82 |
| 3,009,572 | 11/1961 | Seaborn | 198—31.2 X |
| 3,044,620 | 7/1962 | James | 209—82 |

M. HENSON WOOD, JR., *Primary Examiner.*

ROBERT B. REEVES, SAMUEL F. COLEMAN,
*Examiners.*

R. A. SCHACHER, *Assistant Examiner.*